United States Patent [19]

Southard et al.

[11] 4,413,940
[45] Nov. 8, 1983

[54] ROLLED BALE HANDLER

[76] Inventors: Jesse M. Southard; John E. Diehl, both of Rte. #1, Hoyt, Kans. 66440

[21] Appl. No.: 240,278

[22] Filed: Mar. 4, 1981

[51] Int. Cl.³ .......................................... A01D 87/12
[52] U.S. Cl. ................................ 414/24.6; 280/481; 280/760; 414/698; 414/781; 414/911
[58] Field of Search ............... 242/86.52; 172/19, 273, 172/274, 464, 680, 810, 832, 830, 834; 414/24.6, 911, 680, 686, 920, 910, 685, 698, 781; 280/760, 481; 37/DIG. 19

[56] References Cited

U.S. PATENT DOCUMENTS

| | | | |
|---|---|---|---|
| 328,697 | 10/1885 | Marquis | 37/DIG. 19 |
| 2,104,362 | 1/1938 | Cummings | 414/910 |
| 2,617,628 | 11/1952 | Wagner | 414/680 |
| 2,732,637 | 1/1956 | Shadden | 280/760 |
| 2,808,017 | 10/1957 | Killebrew | 414/698 |
| 3,110,145 | 11/1963 | Avery | 56/1 |
| 3,336,041 | 8/1967 | Bouley | 280/481 X |
| 3,779,208 | 12/1973 | Gay | 414/24.6 |
| 3,997,069 | 12/1976 | McCanse et al. | 414/24.6 |
| 4,044,843 | 8/1977 | Holub | 172/810 |
| 4,084,763 | 4/1978 | Zamboni | 414/739 |
| 4,280,777 | 7/1981 | Gray | 414/24.6 |

*Primary Examiner*—Leslie J. Paperner
*Attorney, Agent, or Firm*—Robert E. Breidenthal

[57] ABSTRACT

A bale roller inclusive of an upstanding support frame that can be mounted on the front end of a dirigible and self-propelled vehicle such as a tractor or truck with an auxiliary frame pivotally mounted on the lower end of the support frame for vertical swinging movement about a transverse axis between a raised retracted position and a forwardly projecting operative position. The forward end of the auxiliary frame is constituted of a fixed transverse member having oppositely projecting end portions on which are rotatably mounted a pair of wheels. The wheels have pneumatic tires thereon, and are mounted on the transverse member in the same manner as is conventional for the mounting of automotive front wheels on their spindles. A chain can be used to adjustably support the auxiliary frame from the support frame, or alternatively a fluid actuated cylinder and piston assembly can connect the frames to control their relative positions. The fluid actuated assembly can be conventionally powered from a conventional tractor or the like. The tiltable frame is provided with a tilt gauge viewable from the tractor operator's position.

13 Claims, 8 Drawing Figures

ROLLED BALE HANDLER

The present invention relates to new and useful improvements in apparatus for handling rolled bales of hay and the like, and more particularly relates to apparatus of such character wherein a vehicle mounted attachment having nonrotary as well as rotary mounted components that can be brought to bear against a rolled bale to twist and move the bale on the ground as well as to unroll the same on the ground.

In recent years the baling of animal forage materials such as alfalfa and the like in bales of rectangular parallele-piped configuration has been supplanted to a large extent by forming bales of generally cylindrical configuration in which an elongated mat of the material is compactly rolled, spiral-like, into the cylindrical shape that is finally secured by lengths of binder twine tied thereabout. The character of the rolled bale is such that there is considerable integrity of strength in each of the spiral layers of bale, the successive layers of the mat are readily separable so that the rolled bale can be readily unrolled on cutting of the binding twine. An appreciation of the character of rolled bales and of apparatus that can be used to form the same can be obtained on reference to U.S. Pat. No. 3,110,145 which issued to Avery on Nov. 12, 1963.

Whereas the rectangular bales were customarily of such size that they could be manhandled and their contents easily be dispersed by pitchfork on cutting the binding twine, the size of rolled bales has been generally so much greater that a comparable degree of manhandling is impossible. Accordingly, powered equipment is employed such as forklifts and the like, as well as specialized accessories for farm tractors such as shown in U.S. Pat. No. 3,997,069 which issued to McCanse et al on Dec. 14, 1976.

A powered attachment for tractors is disclosed in U.S. Pat. No. 3,779,208, which issued to Gay on Dec. 18, 1973, affords a background understanding of the present invention and is of particular interest in that the same involves the provision of a powered roller for engaging a rolled hay bale.

The paramount object of the present invention is to provide an attachment for tractors, trucks, and the like that will enable the tractor operator to push a bale with either nonrotatable and rotatable components of the attachment so that the former will allow changing the azimuth of the horizontal axis of the bale and so that the latter will enable the bale to be unrolled without the unrolling being impeded by the engagement of the attachment and the bale.

Another important object of the invention is to provide an attachment of the character described above which can be placed in a retracted or traveling condition without dismounting the same from the tractor when its use is not required.

Still another object of the invention is to provide an attachment of the character described above which in one form will enable manual movement between its retracted and operative positions, and which in another form includes provision for powered movement between such positions.

Yet another object is to provide an attachment of the character described above wherein the height of the rotatable components in its operative condition is adjustable.

A final and very important object of the invention is to provide an attachment of the character described above that combines lightweight, high strength and durability, and which can be economically fabricated by reason of its suitability for incorporating salvaged automobile front wheels and their antifriction mounting as the rotatable components thereof.

A broad aspect of the invention involves a bale roller attachment for self-propelled vehicles such as tractors, trucks, and the like comprising an upstanding and transversely disposed rigid support frame provided with means adapted for securely mounting the same on the front end of a vehicle, an auxiliary open and rigid frame having an overall generally rectangular and planar configuration, said auxiliary frame being disposed forwardly of the support frame and having one end pivotally mounted to a lower portion of the support frame for movement about a transverse and horizontal axis between an upwardly inclined retracted position and a forwardly extending operative position, means operatively connecting the support and auxiliary frames at locations remote from the axis for selectively supporting the auxiliary frame from the support frame in its retracted and operative positions, said auxiliary frame having an end remote from the axis that has at its transverse extremities a pair of oppositely and transversely extending stub axles, and a pair of wheels journaled upon said stub axles.

Briefly, the attachment of the invention provides an open frame mounted at the front of a vehicle such as a tractor, truck or the like that is pivotal about a transverse horizontal axis to swing downwardly and forwardly from a generally upstanding retracted position to a forwardly projecting and largely horizontal attitude that presents a pair of laterally spaced wheels that are rotatable about aligned axes that are parallel to the pivotal mounting axis. The frame is rigid intermediate the wheels with space intermediate the substantially semicircular portions of the wheels most remote from the pivotal axis being free of obstructions. The attachment may include hydraulic means for controlling the tilt of the open frame. The frame is internally cross braced for strength, while yet being sufficiently open so as to allow essentially free air flow to the front of the vehicle when in its raised position, sufficient to cool the vehicle engine.

These and other objects, features and advantages of the invention will become apparent during the ensuing description of a preferred embodiment of the invention, such description being given in conjunction with the accompanying drawings illustrative thereof, wherein.

Figure 1:
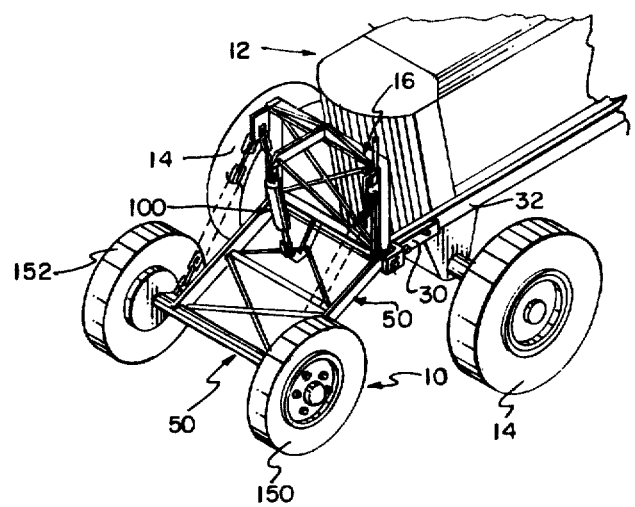
FIG. 1 is an isometric view of one form of the attachment mounted on the front end of a partially shown tractor, with intermediate extents of frame support chains being shown in dashed outline.

Referring now to the drawings wherein like numerals designate like parts throughout the various views, the reference numeral 10 designates generally the bale handling attachment of the present invention which is adapted for mounting at the forward end of a conventional self-propelled and dirigible vehicle such as the farm tractor partially shown at 12. Though the front wheels 14 of the tractor 12 are shown as widely spaced, it will be appreciated that such spacing is strictly optional and that closed spaced wheels of relatively much smaller diameter can be equally suitable. Indeed, it will become apparent that the attachment 10 can be mounted on the front end of utility vehicles such as pickup trucks and the like, and in principle the attachment 10 can be mounted on the rear end of vehicles, though it is preferred that such vehicles include an engine powered hydraulic control unit readily accessible from the vehicle driver's position.

The attachment 10 comprises an upstanding open rigid frame 16 including a horizontal base member 18 that extends between upstanding side members 20 and 22 that are in turn connected by a top frame member 24. The frame 16 also includes a rigid U-shaped mounting bracket 26 that is detachably secured by bolts 28 or any suitable threaded fastening means to the base member 18 so as to present spaced rearwardly extending legs 30. The bracket 26 and its legs 30 constitute means for detachably securing the frame 16 to laterally spaced, longitudinally extending tractor frame components 32 by bolts or any suitable threaded fastening means 34. A pair of brace rods 36 and 38 are disposed to extend diagonally across the open frame 16 with opposite inclinations and have their opposite ends welded to the frame side members 20 and 22 to reinforce and impart mechanical strength to the open frame 16. In the interest of strength, availability of and cost of materials, and ease of fabrication with widely available facilities, the frame 16 is of welded steel construction. Except where the need for other types of materials is obvious, such is generally true of the entire attachment 10.

Figure 2:
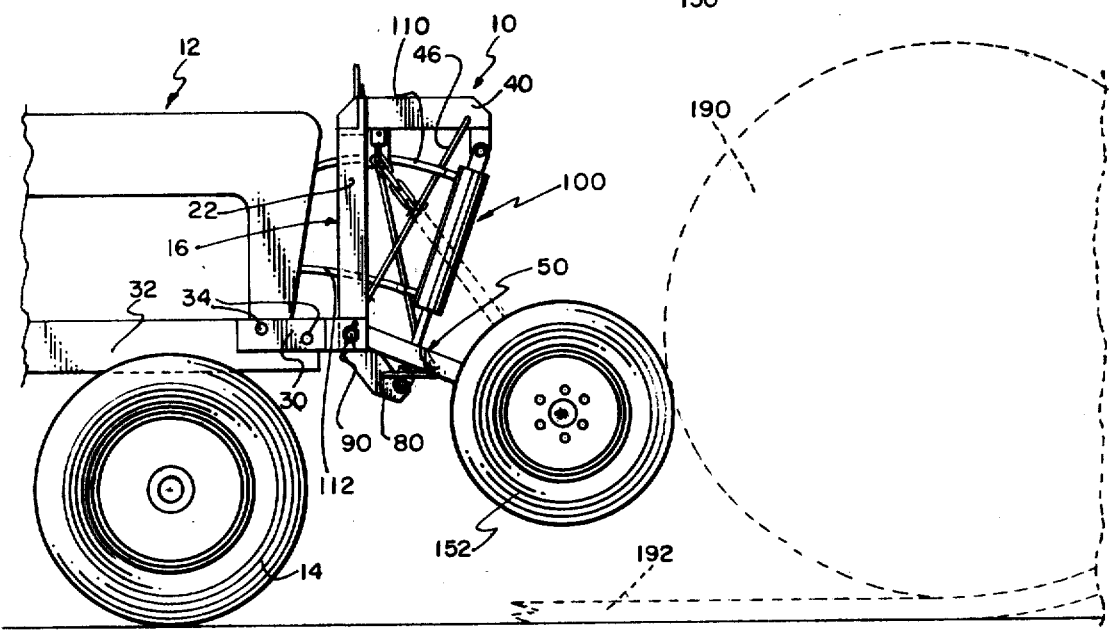
FIG. 2 is an enlarged side elevational view of the structure shown in FIG. 1, with the same being shown in bale unrolling relation to a partially unrolled bale of the rolled type shown in dashed outline.
Figure 3:
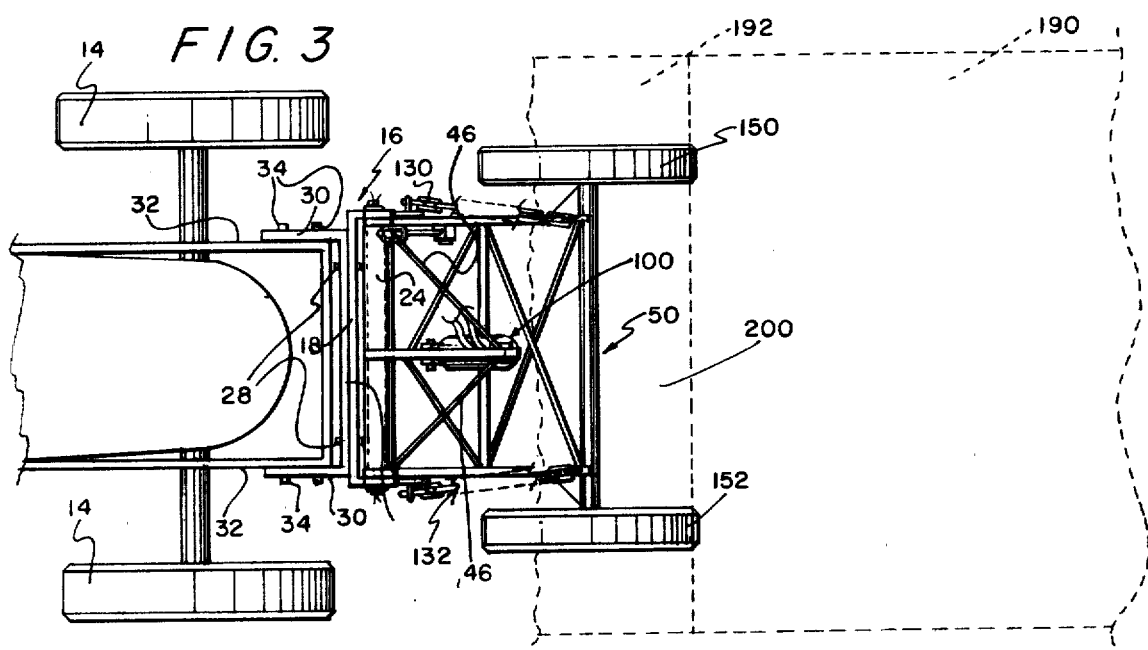
FIG. 3 is a top plan view of the apparatus shown in FIG. 2.
Figure 7:
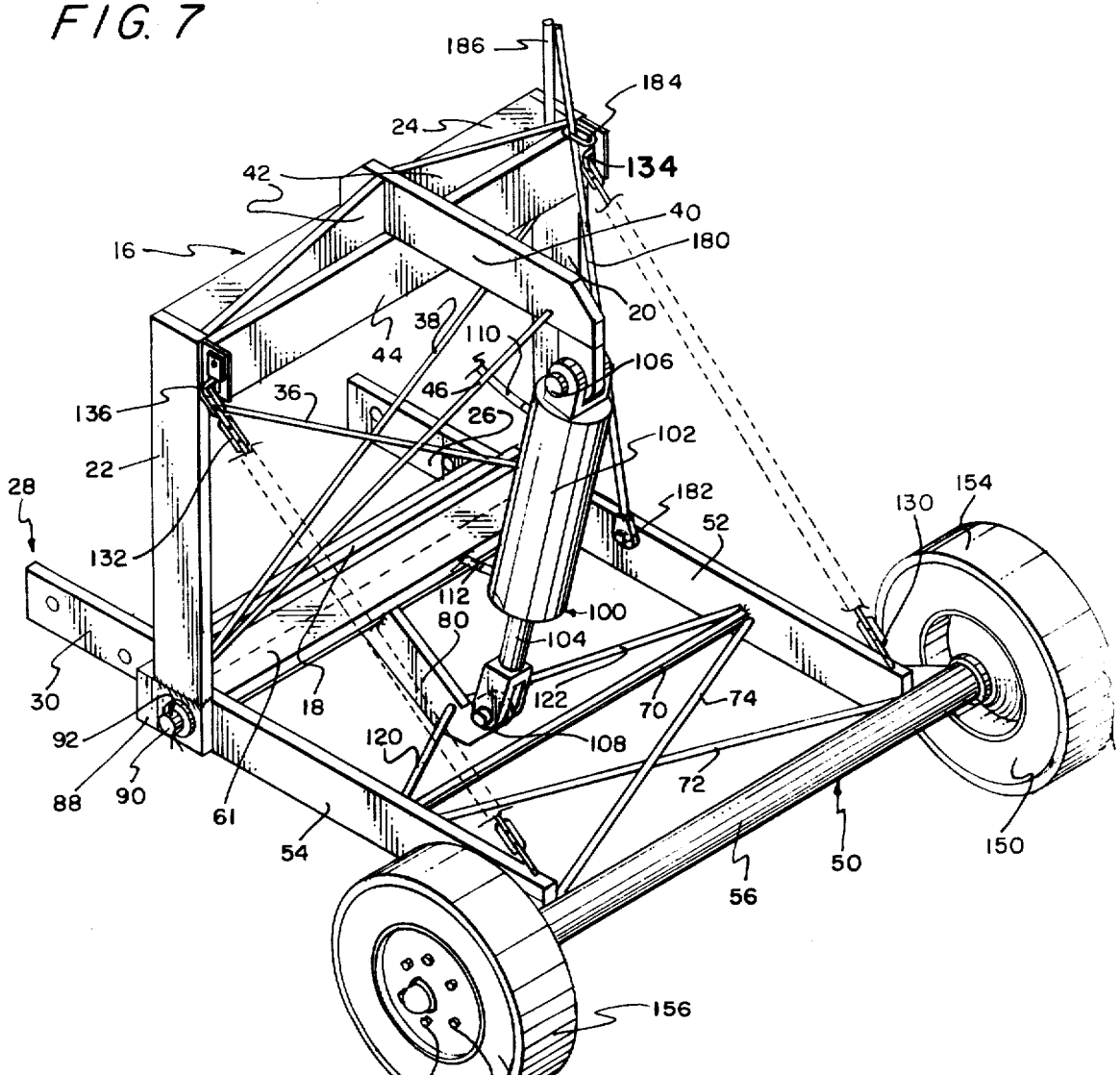
FIG. 7 is an enlarged isometric view of the attachment with the wheeled frame in its lowered operative position, with intermediate extents of the support chains being shown in dashed outline; and, FIG. 8 is an enlarged sectional detail view showing the antifriction mounting of one of the wheels on the auxiliary frame.

For a use to be presently explained, a support arm 40 projects forwardly and horizontally from the center of the top frame member 24 to which it is suitably welded and braced thereon by a pair of gussets 42 welded to the frame member 24 and the support arm 40. The upper portion of the frame 16 is additionally strengthened and the arm 40 given additional support by a crosspiece 44 positioned as best shown in FIG. 7 and having its ends welded to the frame side members 20 and 22. A pair of brace rods 46 are welded to the forward end portion of the arm 40 and to the frame 16 adjacent the lower ends of the side members 20 and 22 as shown in FIGS. 2 and 7.

An open auxiliary frame 50 is provided which comprises a pair of spaced side rails 52 and 54 which are welded to a horizontal transversely extending tubular member 56 at positions spaced inwardly from the extremities of such tubular members 56 as best shown in FIG. 7.

Figure 4:
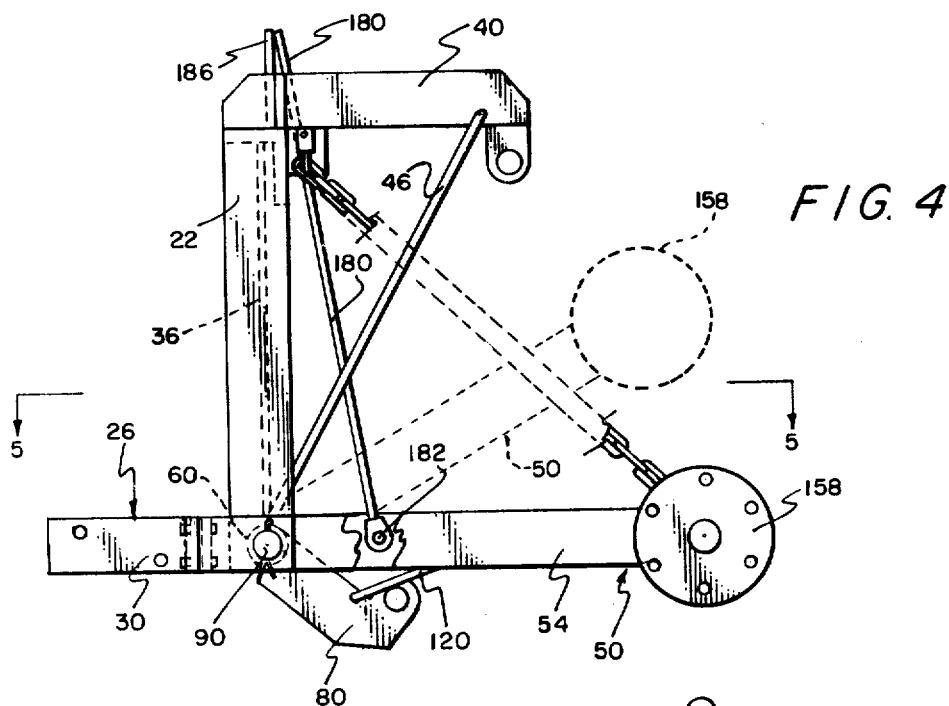
FIG. 4 is a side elevational view of the attachment with the attachment wheels having parts removed and with the fluid power actuating means being removed, and with portions being broken away to reveal hidden parts and certain concealed parts as well as the traveling or raised position of the auxiliary frame being shown in dashed outline.
Figure 5:
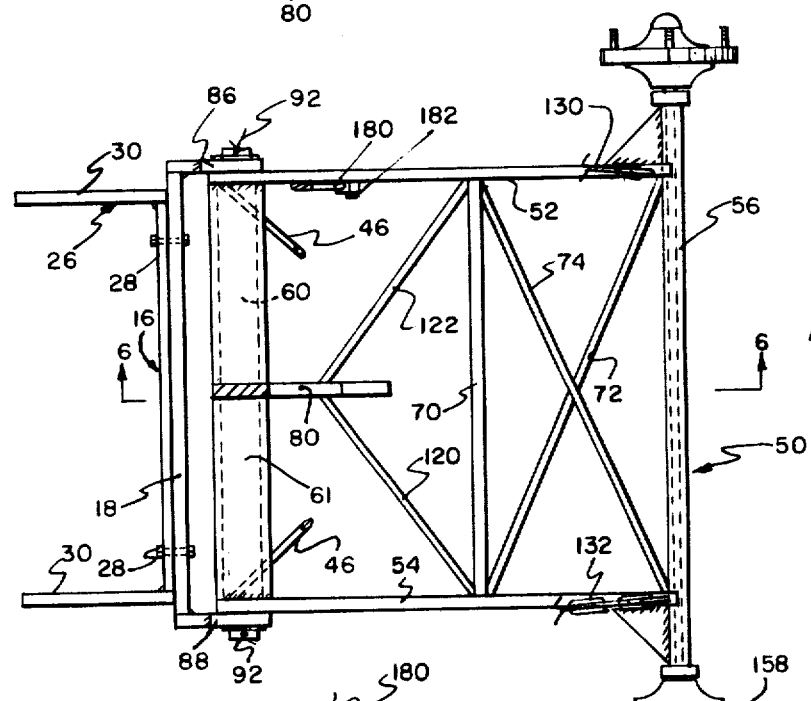
FIG. 5 is a horizontal sectional view taken upon the plane of the section line 5—5 in FIG. 4.
Figure 6:
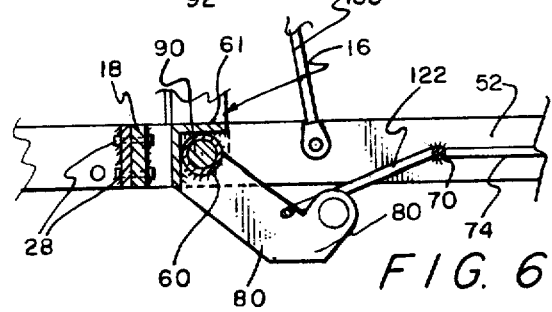
FIG. 6 is a fragmentary vertical sectional detail view taken on the plane of the section line 6—6 in FIG. 5.

Means best shown in FIGS. 4, 5 and 7 are provided for pivotally mounting the rear or lower end of the open auxiliary frame 50 upon the lower end of the mounting frame 16. Such means comprises a tubular member 60 having its opposite ends welded against the rear facing sides of the side members 52 and 54 to constitute with the side members or rails 52 and 54 and the tubular member 56 rigid components of the frame 50. The rear end of the tubular 60 is additionally reinforced by a transversely extending angle member 61 disposed as best shown in FIG. 6 and having its opposite ends welded to the side rails or members 52 and 54. The frame 50 is additionally reinforced by a transverse brace 70 and crossed diagonal rods 72 and 74 having their end extremities welded to the side rails 52 and 54. A radially extending auxiliary frame actuating arm 80 is welded to the center of the tubular member 60 so as to extend forwardly and downwardly from the tubular member 60 when the auxiliary frame 50 and the arm 80 are in the full line positions shown thereof in FIG. 4. The rails 52 and 54 are provided with apertures, not shown, in alignment with the hollow interior of the tubular member 60.

The frame base 18 includes integral forwardly extending portions or mounting ears 86 and 88 that are disposed at and welded to the lower ends of the frame members 20 and 22. The rear ends of the rails 52 and 54 are slidably received between the ears 86 and 88. An elongated pivot shaft 90 extends through the tubular member 60 and through aligned openings, not shown, through the ears 86 and 88. Cotter pin means 92 are provided for the end portions of the shaft 90 to prevent inadvertent displacement from the position shown thereof in the drawings.

Optional hydraulic means 100 is provided for actuating swinging movement of the auxiliary frame 50 about the horizontal transverse axis defined by the shaft 90. Such means 100 comprises a conventional double-acting hydraulic cylinder and piston assembly inclusive of a cylinder 102 and piston rod 104 that are respectively pivotally connected to the arms 40 and 80 adjacent the free ends of the latter at 106 and 108. Hydraulic lines 110 and 112 are connected to the cylinder 102, and it will be understood by those conversant with the art that such lines are connected to a conventional hydraulic control unit, not shown, inclusive of a hydraulic pump driven by the prime mover of the tractor. It will also be manifest that such control unit, as is customary, is disposed at a position convenient to the operating position of the tractor operator. The hydraulic means 100 can be controlled to raise and lower the auxiliary frame 50 as well as to hold the same at selected attitude.

In the preferred construction, brace rods 120 and 122 are welded to connect the arm 80 to the side rails 52 and 54 as shown in FIG. 5.

A pair of link chains 130 and 132 are attached at their forward ends to the rails 52 and 54 respectively. The frame 16 is provided with a pair of hooks 134 and 136 at the opposite ends of the frame member 44, over which selected links of the chains 130 and 132 may be engaged. The arrangement is such that the chains 130 and 132 can be adjusted to support the frame 50 at any selected attitude thereby enabling continued support of the frame 50 after release of hydraulic pressure in the lines 110 and 112.

It will be appreciated that, if desired or deemed expedient, the provision of the hydraulic means 100 can be dispensed with entirely and such means omitted from inclusion in the attachment 10 with the attitude of the auxiliary frame 50 being accomplished manually and the chains being relied upon to support the auxiliary frame 50 in its adjusted position.

Figure 8:
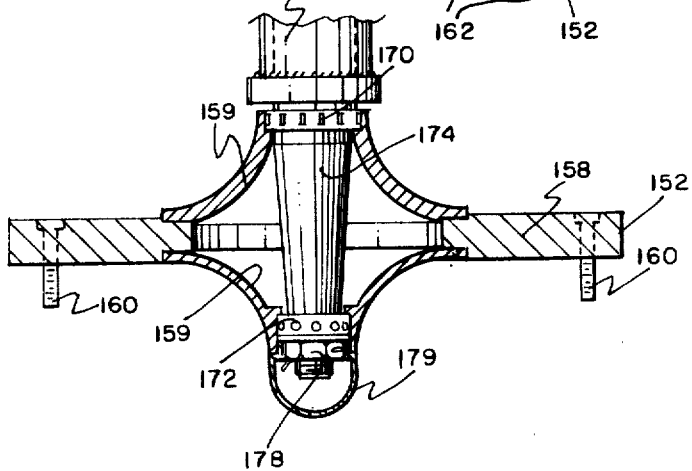

A pair of wheels 150 and 152 are rotatably mounted on the auxiliary frame 50 at the opposite ends of the tubular member 56. In the preferred construction, the wheels 150 and 152 are conventional automobile wheels inclusive of pneumatic tires 154 and 156 and include wheel mounting disks 158 such as shown in FIG. 8 in connection with wheel 152. The mounting disk 158 is secured by threaded studs 160 and nuts 162 to other wheel components in the conventional manner. The mounting disk 158 which includes an integral hub section 159 is rotatably supported on ball bearings 170 and 172 that are disposed on a stub axle 174 that is in turn welded to the tubular member 56. The disk 158 and its hub 159 are removably retained on the axle 174 and the bearings 170 and 172 in the conventional manner by nut and cotter pin combination 178 over which is positioned a dust cover 179. It is important it be noted that the wheels 150 and 152 as well as their antifriction mounting on the frame 50 are entirely conventional and correspond to ordinary automobile front wheels and their mounting. Consequently, a great economy can be effected by utilizing such components as are usually to be found in abundance at modest expense in automobile salvage yards.

As the wheeled auxiliary frame 50 is largely hidden from the tractor operator's view when in its operating position shown in full lines in all the drawings, guage means is provided within view of the operator so that he may judge the height of the frame 50 when hydraulically adjusting the same. Such means includes an elongated gauge rod 180 having its lower end pivoted to the side rail 52 of the frame 50 at 182. The gauge rod 180 extends upwardly through a guide loop 184 on the upper end of the frame 16 in such an arrangement that the upper end of the rod 180 moves upwardly and downwardly as a scaled down version of corresponding direction of movement of the wheels 150 and 152. An upstanding sight rod 186 carried by the frame 16 enhances the accuracy of the operator's estimate of the position of the wheels 150 and 152. The top of the rod is selected to be approximately of the height of the top of the rod 180 when the wheels 150 and 152 are at an average height of use. With such arrangement, the operator can easily set the height of the wheels 150 and 152 relative to usual position of use.

The use of the attachment 10 will be readily understood.

Assuming a rolled bale is lying on the ground with its axis parallel to the ground but oriented to unroll in an undesired direction, the operator can, preferably before cutting the binder cord, maneuver the tractor 12 so as to bring the tubular member 56 to bear against an end of the bale in a direction inclined an acute angle to the axis of the bale. In this manner an end of the bale is caught up against the rigid member 56 so that the bale can be twisted on the ground to change the azimuth of its axis without unduly causing the bale to roll on the ground. With a portion of the bale disposed or caught in the otherwise unobstructed space 200 between the forward portions of the wheels 150 and 152, the bale can be easily twisted about and indeed the inner side of one of the wheels 150 and 152 can be caused to apply a lateral force against the bale, with the wheel also serving to retain the bale in the space or pocket 200.

After the bale is oriented properly and the binder cord thereof cut, the bale 190 can be pushed in a direction perpendicular to the axis of the latter by the wheels 150 and 152 as shown in FIG. 2 to unroll the mat or layer 192 therefrom. It will be appreciated that the spacing of the wheels 150 and 152 is preferably such as to be considerably less than the axial length of the bale 190, but not so much less that the bale cannot be contacted directly with a rigid portion of the frame and side thrust applied by the wheels.

After conclusion of bale handling operations (twisting and unrolling), the wheeled frame 50 can be raised to its retracted or traveling position suggested in dashed outline thereof in FIG. 4. Such can be either manually or hydraulically effected. The chains 130 and 132 are then adjusted for sustained support.

It will be appreciated that the attachment can be easily assembled upon a vehicle by reason of the severable character thereof; the same being comprised of the U-shaped mounting bracket, the frame 16 (of which the mounting bracket may be considered a detachable component), the frame 50, the hydraulic means 100, the shaft 90, and the detachable wheels 150 and 152. In mounting the attachment, the U-shaped mounting bracket can be mounted on the vehicle prior to attachment of the remainder of the frame 16 so as to minimize the amount of weight the installer need lift. The wheels can then be mounted on the frame 50 so that the latter can be easily rolled into position for securance to the frame 16 by the shaft 90. Final assembly is then essentially completed by mounting the hydraulic means 100.

The severable character of the attachment not only facilitates the mounting and dismounting thereof, but also makes for convenient and compact storage and ease of shipping. The detachable character of the U-shaped mounting bracket contributes significantly to such advantages as will be evident to those conversant with the art.

From the foregoing, the construction of principles of and the use of the invention will be further understood, and attention is now directed to the appended claims.

We claim:

1. A bale roller attachment for tractors and the like, comprising an upstanding and transversely disposed rigid support frame provided with means adapted for securely mounting the same in fixed relation on the front end of a tractor, an auxiliary open and rigid frame having an overall generally rectangular and planar configuration, said auxiliary frame being disposed forwardly of the support frame and having one end pivotally mounted to a lower portion of the support frame for movement about a transverse and horizontal axis between an upwardly and forwardly inclined retracted position and a relatively lower forwardly extending operative position, means operatively connecting the support and auxiliary frames at locations that are respectively remote from the axis for selectively supporting the auxiliary frame from the support frame in its retracted and operative positions, said auxiliary frame having an end remote from the axis that has as its transverse and forward extremities a pair of oppositely and transversely extending stub axles, with said stub axles being horizontal and aligned with each other in fixed parallelism to said axis, and a pair of wheels freely and independently journaled upon said stub axles, the arrangement being such that space forward of the auxiliary frame is substantially unobstructed between the wheels.

2. The combination of claim 1, wherein the pivotal movement of the auxiliary frame affords a range of operative positions for the auxiliary frame corresponding to a range of heights for the wheels, and wherein the means for supporting the auxiliary frame enables the auxiliary frame to be selectively supported at a plurality of positions within the range of such operative positions.

3. The combination of claim 2, wherein said means for supporting the auxiliary frame comprises a fluid actuated cylinder and piston combination disposed laterally intermediate the wheels, the arrangement being such that the cylinder and piston combination are disposed in space between the wheels when the auxiliary frame is in elevated position.

4. The combination of claim 3, wherein said auxiliary frame and the wheels have a center of mass substantially forwardly of the axis when the auxiliary frame is in its forwardly extending operating position, and wherein said means for supporting the auxiliary frame comprises an elongated and flexible tension element connecting the frames.

5. The combination of claim 1, wherein said auxiliary frame includes a pair of spaced and coplanar side members extending between the ends of such frame, and wherein the remote end of said auxiliary frame includes an elongated remote end member that is coplanar with the side members, said remote end member being rigidly secured at positions spaced from its opposite ends to the side members, in an arrangement such that opposite end portions of said remote end member project freely from the side members and constitute said stub axles.

6. The combination of claim 1, wherein said auxiliary frame includes a pair of elongated, spaced and coplanar side members, an elongated pivot member fixedly secured at positions spaced from its ends to the side members, said pivot member having remote end portions serving as trunnions and being journaled in the support frame.

7. The combination of claim 6, wherein the support frame includes adjacent its top a forwardly projecting support arm terminating in a free end, an actuating arm disposed below the support arm and fixedly secured to the pivot member to extend radially from said axis and to terminate in a free end, and wherein said means operatively connecting the frames comprises a fluid actuated cylinder and piston combination connected between the free ends of said arms.

8. The combination of claim 7, wherein space intermediate the wheels that is also forwardly of and below the auxiliary frame, when the latter is in its operative position, is free of obstructions.

9. The combination of claim 1, wherein space intermediate the wheels that is also forwardly of and below the auxiliary frame, when the latter is in its operative position, is free of obstructions, whereby the auxiliary frame can be canted with respect to a bale partially received between the wheels while being engaged by only one of the latter.

10. The combination of claim 1, wherein the wheels include pneumatic tires.

11. The combination of claim 1, including gauge means for enabling a remote indication of the position of the auxiliary frame when the latter is adjacent its operating position, said gauge means comprising a guide fixed to an upper portion of the support frame, and an elongated gauge rod operatively associated with the guide and having a lower end pivoted to the auxiliary frame.

12. Apparatus for maneuvering and unrolling rolled hay bales comprising a self-propelled dirigible vehicle having a longitudinal axis, a wheeled frame pivotally connected to the vehicle at a longitudinal end of the latter for swinging movement about a horizontal pivot axis that is transverse to the longitudinal axis of the vehicle, said frame being of a generally planar and rectangular configuration and having an end integral therewith that is remote from the pivotal axis and generally parallel to the latter, said frame being pivotally movable between a relatively horizontal operative position to a retracted position wherein the same is relatively inclined upwardly from the pivotal axis toward said end thereof, a pair of wheels disposed on opposite sides of the frame and being mounted on the frame for free rotation about a common axis that is in closely spaced parallelism to said end of the frame and in fixed parallelism to said pivoted axis, the arrangement being such that said wheels have substantial portions thereof that are further removed from the pivotal axis than said integral end of the frame with the space between such portions of the wheels being substantially free of obstructions, and power means for supporting the frame from the vehicle at selected angles of inclination about its pivotal axis.

13. The combination of claim 12 including an attitude indicator means operable in response to pivotal movement of the frame to indicate the inclination of the frame whereby an operator of the vehicle may be apprised of and can adjust the height of the wheels above the ground although the frame and the wheels may be concealed from direct observation.

* * * * *